United States Patent Office 2,842,003
Patented July 8, 1958

2,842,003
ELECTRICAL CONTROL APPARATUS
Hubert Fussangel, Berlin-Mariendorf, Germany, assignor to Firma Fritz Werner Aktiengesellschaft, Berlin-Marienfelde, Germany Application July 9, 1953, Serial No. 367,001
3 Claims. (Cl. 74—365)

The present invention relates to an electrical control apparatus.

More particularly, the present invention relates to an electrical control apparatus of the type which is intended to control the speed of rotation of machines, such as machine tools and the like, which are driven through variable speed devices at a chosen one of a number of different speeds.

At the present time great inconvenience is involved when the speeds of machines of the above type are to be changed. It is necessary, for example, to stop the machine, then to change the setting of the gears or the like of the variable speed drive, and then to again start the machine. It is highly desirable when performing certain types of operations to be able to change over almost immediately from one speed to another so that a more or less continuous cut having different speeds may be provided with a machine tool, but up to the present time it has not been possible to accomplish this result.

One of the objects of the present invention is to provide a control apparatus which is capable of changing the speed of a variable speed transmission, for example, in a substantially instantaneous manner.

A further object of the present invention is to provide a control apparatus which, while a variable speed transmission is operating at one speed, is capable of presetting the apparatus for changing over to a different speed without in any way affecting the operation of the transmission at the said one speed thereof.

Another object of the present invention is to provide a control apparatus which is capable of changing the speed of a variable speed transmission or the like simply by the operation of a single switch.

An additional object of the present invention, is to provide an apparatus capable of accomplishing all of the above objects and at the same time being of an extremely simple construction which is very reliable in operation.

With the above objects in view, the present invention mainly consists of an electrical control apparatus which includes a plurality of electrical control devices adapted to be selectively energized, and a plurality of holding circuits respectively connected electrically to the control devices for selectively maintaining one of the control devices energized when the holding circuit connected thereto is closed. A plurality of selector circuits are respectively bridged by the holding circuits and are respectively connected to the control devices for selectively energizing one of the control devices when the selector circuit connected thereto is closed. Finally, a means is provided for first selectively closing one of the selector circuits and simultaneously opening the holding circuits and then opening the selector circuits and simultaneously closing the holding circuit connected to the said one selector circuit so as to energize the control device connected to the said one selector circuit and then maintain this latter control device energized after the said one selector circuit is opened.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

In the description and claims which follow, a normally closed switch of a relay is intended to signify a relay switch which is closed when the relay is unenergized, and a normally open switch of a relay is intended to signify a relay switch which is open when the relay is unenergized.

Figure 1:
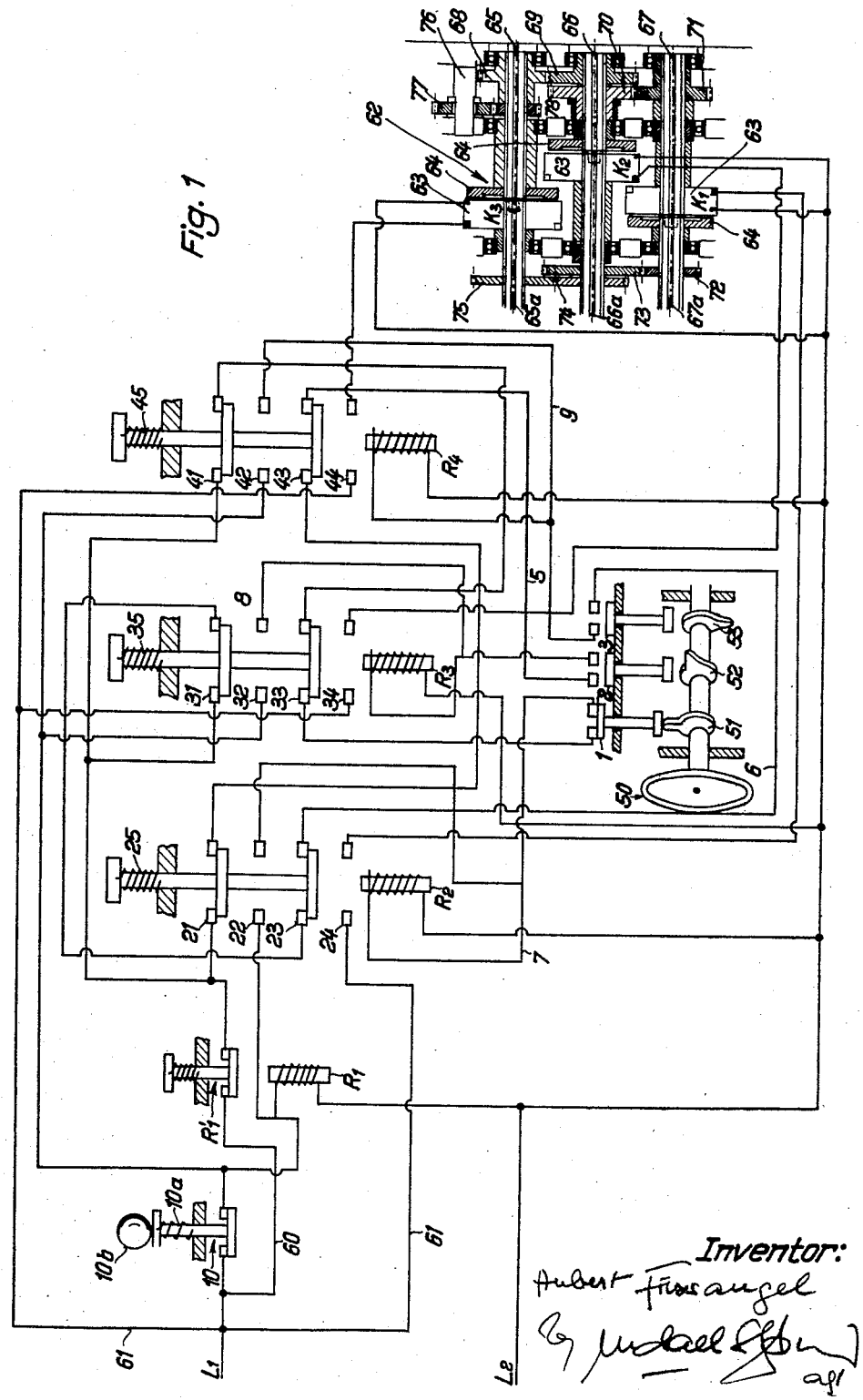
Fig. 1 is a diagrammatic illustration of the apparatus of the invention and the switches and wiring associated therewith.

Referring now to the drawings, and in particular to Fig. 1, it will be seen that the electrical apparatus of the invention is connected between a pair of lines $L_1$ and $L_2$ for leading current to and from the apparatus. A control switch 10 is located in the line $L_1$ for opening and closing the latter, this control switch being urged to its closed position by the spring 10a, as is diagrammatically shown in Fig. 1, and having a knob 10b adapted to be grasped by the operator, this switch 10 being manually actuated in the particular example shown in the drawings although it is possible to automatically open and close this switch 10, as will be pointed out below.

A line 60 connected to the line $L_1$ before the switch 10 thereof, so that the line 60 is not affected by operation of the switch 10, includes a normally closed switch $R'_1$ of a relay $R_1$ which is located in the circuit 11 controlled by switch 10 and extending between the lines $L_1$ and $L_2$, so that relay $R_1$ is only energized when the switch 10 is closed. The circuit 11 of relay $R_1$ is electrically connected to the normally open switches 22, 32, and 42 of relays $R_2$, $R_3$, and $R_4$, respectively, these switches 22, 32, and 42 being located respectively in holding circuits 7, 8, and 9. The circuits 7, 8, and 9 respectively lead from the normally open switches 22, 32, and 42 to one terminal of the electromagnets of relays $R_2$, $R_3$, and $R_4$, and the other terminals of these electromagnets are connected to the line $L_2$.

A second line 61 electrically connected to the line $L_1$ before the switch 10 thereof, so as not to be affected by this switch, leads to the normally open switches 24, 34 and 44 of the relays $R_2$, $R_3$, and $R_4$, these switches 24, 34, and 44 being connected to one terminal of the electromagnets $K_1$, $K_2$, and $K_3$, respectively, so that these electromagnets are energized when the switches 24, 34, and 44 are closed, the other terminals of these electromagnets being respectively connected to the line $L_2$.

As is diagrammatically shown at the right hand side of Fig. 1 a variable speed transmission is adapted to be controlled by the electromagnetic apparatus $K_1$, $K_2$ and $K_3$. Each of these electromagnetic apparatus includes an electromagnet 63 and an armature 64 which is adapted to be attracted to the magnet 63 when the latter is energized so as to form a unit therewith. Splined shafts 65 and 66 are rotatably supported in suitable bearings, as shown in Fig. 1, and carry the armatures 64 of the electromagnetic apparatus $K_3$ and $K_2$ respectively, so that these latter two armatures are slidable along the length of shafts 65 and 66 while being constrained to rotate therewith. Shaft 67a is rotatably mounted in a suitable bearing of the apparatus and is splined and carries the armature 64 of the electromagnetic apparatus $K_1$.

Shafts 65a and 66a are respectively separate from and coaxial with the shafts 65 and 66, are turnably mounted in bearings, and respectively have the electromagnets 63 of the electromagnet apparatus $K_3$ and $K_2$ fixedly mounted thereon so that these latter two electromagnets rotate together with the shafts 65a and 66a, respectively, and are not axially shiftable with respect to these shafts. The shaft 67 is turnably supported on suitable bearings, is separate from and coaxial with shaft 67a, and has the electromagnet 63 of the electromagnetic apparatus $K_1$ fixedly mounted thereon.

Thus, when the magnet 63 of apparatus $K_3$ is energized, the armature 64 thereof will be attracted to this magnet 63 and will rotate therewith so that the shafts 65 and 65a will rotate together as a unit, and in the same way when the electromagnetic apparatus $K_2$ is energized shafts 66 and 66a will rotate together as a unit and when electromagnetic apparatus $K_1$ is energized shafts 67 and 67a will rotate together as a unit. When any one of the electromagnetic apparatus $K_1$–$K_3$ is unenergized, the shaft portions associated therewith rotate independently of each other.

The drive for the transmission 62 is derived from any suitable motor or the like which rotates the gear 77 mounted on the shaft 76, and gear 77 meshes with gear 78 which is fixed to the shaft 65 to rotate the latter. The gear 68 is also fixed to the shaft 65 and meshes with the gear 69 fixed to the shaft 66, and gear 70 is also fixed to the shaft 66 and meshes with gear 71 which is fixed to the shaft 67. Thus, during rotation of gear 77 all of the gears 68–71 rotate and consequently all of the shafts 65–67 also rotate.

Gear 75 is fixed to the shaft 65a and provides the power outlet from which power is taken off from the transmission 62. Gear 75 meshes with gear 74 which is fixed to the shaft 66a and gear 73 is also fixed to the shaft 66a and meshes with gear 72 which is fixed to the shaft 67a.

Thus, if the electromagnetic apparatus $K_3$ is energized, the shafts 65 and 65a will rotate as a unit so that the gear 75 will be turned with the same speed of rotation as the shaft 65. If the electromagnetic apparatus $K_2$ is energized while the electromagnetic apparatus $K_3$ and $K_1$ are unenergized, the drive will go from gear 77 through gears 78 and 68 to gear 69 and from the latter along the shafts 66 and 66a to the gear 74 which will rotate the gear 75 with a speed of rotation different from that provided by the energizing of electromagnetic apparatus $K_3$. On the other hand, if the electromagnetic apparatus $K_1$ is energized, while the electromagnetic apparatus $K_2$ and $K_3$ are unenergized, the drive will go from the gear 77 along the gears 68–71 to the shafts 67 and 67a and from the gears 72–74 to the output gear 75 which in this event rotates at a third speed of rotation. Thus, three different driving speeds are provided by transmission 62 shown in Fig. 1, and it is to be noted that the speed of gear 75 may be changed while the machine driven thereby is under load because none of the gears of the transmission 62 are shifted into or out of mesh with each other during a change in the speed of the gear 75.

The line 60, in which the normally closed switch $R'_1$ of relay $R_1$ is located, leads to the normally closed switches 21, 31, and 41 of the relays $R_2$, $R_3$, and $R_4$, respectively, and these normally closed switches 21, 31, and 41 respectively lead to the normally closed switches 43, 23, and 33 of the relays $R_4$, $R_2$, and $R_3$, respectively. These latter normally closed switches 43, 23, and 33 respectively lead to the switches 2, 3, and 1 which are adapted to be selectively actuated by the cams 52, 53, and 51, respectively, these cams being mounted on a common cam shaft turnable, for example, by the handwheel 50 and these cams all extending at different angles so that only one of the switches 1–3 can be closed at any given time. In the position of the parts shown in Fig. 1, the switch 1 is shown in an almost closed position. These switches 1–3 are in turn connected respectively to the holding circuits 7–9, so that the switches 41, 33, and 1 form a selector circuit 4 which is bridged by the holding circuit 7, the switches 21, 43, and 2 form a selector circuit 5 which is bridged by the holding circuit 8, and so that the switches 31, 23, and 3 form a selector circuit 6 which is bridged by the holding circuit 9. The relationship of the various circuits described above is clearly illustrated in Fig. 2. As is apparent from Fig. 1 the spring 25 holds the switches 21 and 23 of relay $R_2$ in their normally closed position, the spring 35 holds the switches 31 and 33 of relay $R_3$ in their normally closed position, and the spring 45 holds the switches 41 and 43 of relay $R_4$ in their normally closed position.

The above described apparatus operates as follows:

Assuming that the parts are in the idle position shown in Fig. 1 and that the selector wheel 50 is turned through a slight distance so as to close the selector switch 1, it is evident that nothing will happen upon closing of this switch 1 because the switch 10, which is closed, maintains the relay $R_1$ energized and therefore maintains the normally closed switch $R'_1$ open so that current cannot flow through any of the selector circuits 4–6. The operator will now grasp the knob 10b and open the switch 10 against the action of spring 10a so as to deenergize relay $R_1$, and this will cause the switch $R'_1$ to close so that current will flow through the selector circuit 4 to energize the relay $R_2$ so as to thereby close the normally open switches 22 and 24 and open the normally closed switches 21 and 23. Since these normally closed switches 21 and 23 are located in the selector circuits 5 and 6, it is evident that these selector circuits cannot be closed simultaneously with the selector circuit 4.

The closing of the normally open switch 24 energizes the electromagnet $K_1$ so that the variable speed transmission 62 operates at a predetermined speed, as was described above. Now the operator releases the switch 10 so that it will automatically close, and this closing of switch 10 will energize relay $R_1$ so as to open the normally closed switch $R'_1$ and thereby cut off the flow of current to the selector circuits 4–6. However, simultaneously with the opening of switch $R'_1$, the switch 10 is closed to send current through the holding circuit 7 because the normally open switch 22 of this holding circuit was placed in its closed position by energizing of relay $R_2$ upon closing of the selector circuit 4. Thus, even though this selector circuit 4 is open, the holding circuit 7 maintains the relay $R_2$ energized so as to also maintain the control device $K_1$ energized, and the apparatus continues to operate at the speed of rotation determined by control device $K_1$.

Assuming now that the operator wishes to change to a different driving speed, such as for example that given by the energizing of electromagnetic apparatus $K_3$, the operator will turn the hand wheel 50 so as to cause the cam 53 to close the switch 3, the other selector switches 1 and 2 being open at this time. It is apparent that the closing of switch 3 will have no effect on the operation of the variable speed transmission 62 because the relay $R_1$ is still energized to maintain the normally closed switch $R'_1$ open. Thus, the selector circuits in cooperation with the mechanical actuating means 50–53 of the selector switches 1–3 provides a means for presetting the structure for a change over to a different driving speed without in any way effecting the prevailing speed of operation, in this case the speed given by the energized control device $K_1$.

Thus, the closing of switch 3 places the apparatus in condition to have the speed thereof changed. At the moment when the operator wishes to thus change the speed of operation, he merely opens the switch 10 against the action of spring 10a so as to deenergize relay $R_1$ and close the normally closed switch $R'_1$ which causes current to flow through the selector circuit 6 so as to energize the relay $R_4$, the relay $R_2$ being deenergized upon opening of the switch 10, so that in this way the relay $R_4$ is energized simultaneously with the deenergizing of relay $R_2$ and therefore the control device $K_3$ is energized simultaneously with the deenergizing of the control device $K_1$. Thus, in the particular example described, the speed is almost instantaneously changed over from the speed given by electromagnet $K_1$ to that given by electromagnet $K_3$. The energizing of relay $R_4$ upon closing of selector circuit 6 by opening the switch 10 closes the normally open switch 42 as well as the normally open switch 44 which enabled the electromagnet $K_3$ to become energized when the control switch 10 was open. The release and closing of the switch 10 now causes current to flow through the holding circuit 9 to maintain the relay $R_4$ energized so that control device $K_3$ is maintained energized and the apparatus now continues to operate at the different speed. It is apparent that with the above-described apparatus all that is required to change the speed of the transmission 62 is to preliminarily set the hand wheel 50 in a predetermined position for closing one of the switches 1–3 and then, at the desired moment, to open the switch 10.

As was mentioned above, when the relay $R_2$ is energized the normally closed switches 21 and 23, respectively located in selector circuits 5 and 6, are open so that these latter selector circuits cannot be closed and it is therefore impossible to energize the relays $R_3$ and $R_4$ simultaneously with the energizing of relay $R_2$. Similarly, when the relay $R_4$ is energized, the normally closed switches 41 and 43 are opened to prevent closing of the selector circuits 4 and 5, respectively, and in the same way when the relay $R_3$ is energized the normally closed switches 31 and 33 are opened to prevent closing of the selector circuits 4 and 6. Thus, each of the selector circuits includes a normally closed switch of all of the relays except that connected to the particular selector circuit so that with the above-described apparatus it is only possible to energize one of the relays $R_2$–$R_4$ and one of the control devices $K_1$–$K_3$ at any given time. This is a safety feature which prevents simultaneous energizing of two or more control devices.

As was mentioned above, the switch 10 may be automatically operated, and in order to accomplish this result, it is only necessary to provide a suitable cam or the like for opening and closing the switch 10 at a predetermined time as well as an automatic control for the mechanical selector apparatus 50–53. With such an arrangement it is possible to automatically change the speeds of the output gear 75 in any desired manner.

Although the above-described structure includes only three possible speeds for the transmission 62, it is to be understood that any number of speeds may be controlled with similar apparatus, and also several groups of three transmission speeds each, for example, may be simultaneously controlled to provide a predetermined speed in each group. For example, three sets of transmission apparatus as shown in Fig. 1 would provide a unit having nine different speeds, and three of these units would provide twenty-seven different speeds.

Figure 2:
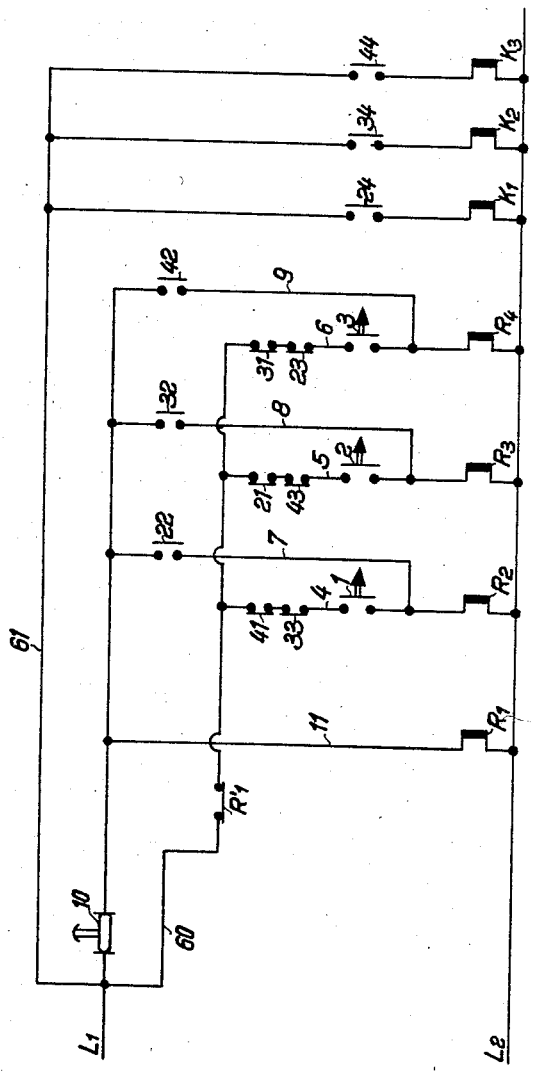
Fig. 2 illustrates the various circuits of the control apparatus of the invention.
Figure 3:
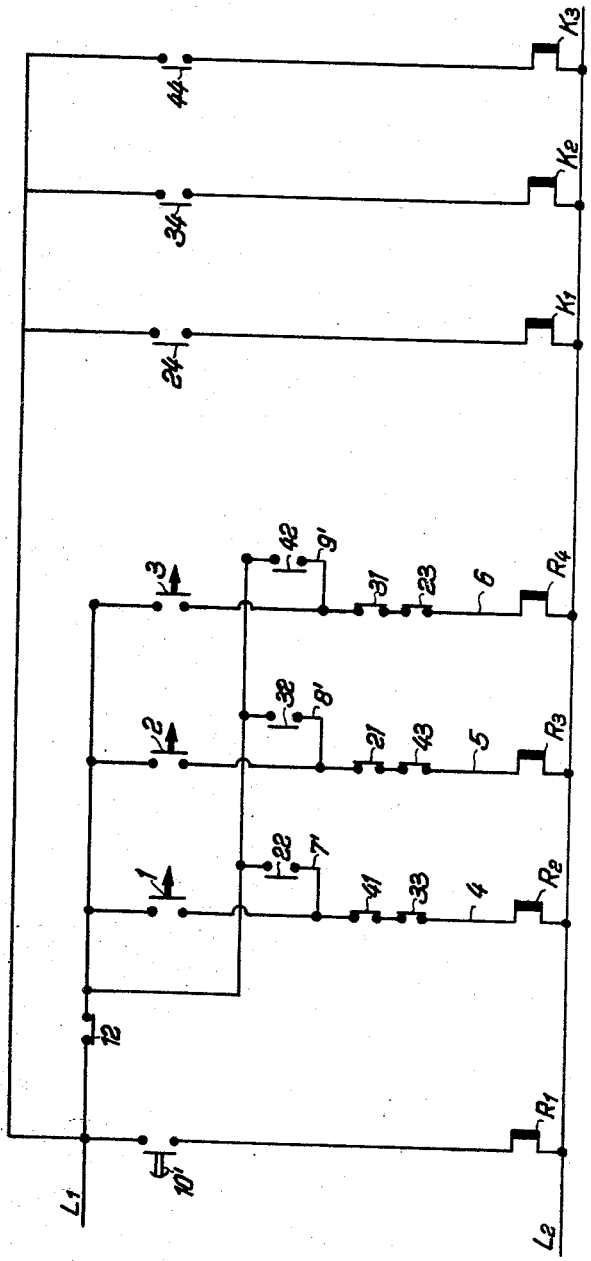
Fig. 3 illustrates various circuits of a control apparatus somewhat different from that shown in Fig. 2.

Fig. 3 of the drawings shows an arrangement which is very similar to that of Fig. 2 and wherein the same parts are indicated with the same reference characters. The slightly different parts of Fig. 3 are indicated with primed reference characters which are the same as those used to designate the corresponding parts of Fig. 2. The structure of the relays $R_2$, $R_3$ and $R_4$ of Fig. 3 is identical with the same relays of Fig. 2, and the selector circuits 4, 5 and 6 of Fig. 3 are identical with those of Fig. 2. Also the electromagnetic apparatus $K_1$, $K_2$, $K_3$ is identical with that of Fig. 2.

The relay $R_1$ of Fig. 3 is also identical with that of Fig. 2, and the normally closed switch 12 thereof is identical with the normally closed switch $R'_1$ but is located in a different part of the circuit. The holding circuits 7', 8', 9' of Fig. 3 are identical with holding circuits 7–9 of Fig. 2 except that they bridge only the selector switches 1–3 in the embodiment of Fig. 3, and the switch 10' is different from switch 10 of Fig. 2 only in that the switch 10' is normally open and is closed only when depressed by hand against the action of a spring. The normally closed switch 12 of relay $R_1$ is located in the line $L_1$ so that when this normally closed switch is opened the holding circuits 7'–9' as well as the selector circuits 4–6 will be open.

The embodiment of Fig. 3, which except for the above difference is identical with that of Fig. 2, operates as follows:

When it is desired to set the apparatus in operation with a particular speed of the transmission 62, the switch 10' is manually closed so as to energize relay $R_1$ and thereby open the switch 12 so that all holding circuits and selector circuits are open. Then the hand wheel 50 of Fig. 1 is turned to close one of the selector switches 1–3, such as for example, the switch 1 as shown in Fig. 1. Nothing will happen at this time because switch 10' is closed and therefore the normally closed switch 12 is open. However, upon release of the switch 10' the relay $R_1$ is deenergized so that switch 12 closes and the current then passes through the selector circuit 4 to energize relay $R_2$. This circuit 4 is closed upon closing of selector switch 1 because the normally closed switches 41 and 33 of the relays $R_4$ and $R_3$ are located in this circuit and these latter two relays are deenergized, as was the case with the embodiment of Figs. 1 and 2. The energizing of relay $R_2$ opens the normally closed switches 21 and 23, as is apparent from Fig. 1, so that the selector circuits 5 and 6 cannot be energized simultaneously with the selector circuit 4, and the normally open switches 22 and 24 are closed so as to close the holding circuit 7' and so as to energize the electromagnetic apparatus $K_1$, respectively.

Thus, after the selector switch 1 is closed, it is only necessary to close and release the switch 10' and the apparatus is set into operation at the speed determined by the electromagnetic apparatus $K_1$. It will be noted that with the embodiment of Fig. 3 the relay $R_1$ is deenergized during operation of the apparatus whereas with the embodiment of Figs. 1 and 2 the relay $R_1$ is maintained energized during operation of the apparatus, and that the switch 10' is normally open while the switch 10 of Figs. 1 and 2 is normally closed.

Immediately after the apparatus is first set into operation at one of the speeds of the transmission 62, the speed determined by the electromagnetic apparatus $K_1$ in the example described above, the hand wheel 50 may be turned to close any one of the other selector switches without in any way disturbing the operation. For example, the turning of hand wheel 50 to close selector switch 2 will not disturb the operation of the apparatus because the switch 1 is bridged by the holding circuit 7' and therefore the relay $R_2$ will be maintained energized after the opening of switch 1. Thus, in the example described the selector switch 2 is closed while the apparatus continues to operate with the energized relay $R_2$. The closing of switch 2 does not in and of itself energize the relay $R_3$, because the normally closed switch 21 in the selector circuit 5 is maintained open by the energized relay $R_2$.

At the moment that the operator desires to change the speed to that determined by the electromagnetic apparatus $K_2$, the apparatus having been preset for this change over by the previous closing of selector switch 2, it is only necessary for the operator to depress and release the switch 10'. The depression of the switch 10' opens all selector and holding circuits so that relay $R_2$ becomes deenergized and the subsequent release of switch 10' deenergizes relay $R_1$ so as to close switch 12 which results in energizing of relay $R_3$ and electromagnetic apparatus $K_2$ to effect the desired changeover in speed.

It is believed to be apparent that closing of selector switch 3 and depression and release of switch 10' will change the speed of the apparatus to that determined by energizing the control device in the form of electromagnetic apparatus $K_3$. The changes in speed may be effected simply by a depression and almost immediate release of switch 10' so that although all of the apparatus is momentarily deenergized, the end result is a change in speed during continuous operation because the inertia of the machine is sufficient to maintain it in operation during the substantially instantaneous time that all of the circuits are open.

It will be understood that each of the elements described above, or two or more together, may also find a useful application in other types of electrical control apparatus differing from the types described above.

While the invention has been illustrated and described as embodied in electrical control apparatus for variable speed transmissions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and therefore, such adaptations should and are intended to be comprehended within the meaning and range of equivalence of the following claims.

What is claimed as new and desired to be secured by Letters Patent is:

1. Electrical control apparatus comprising, in combination, a plurality of electrical control devices adapted to be selectively energized; a plurality of electrically conductive lines respectively leading to said control devices for feeding current thereto; a plurality of selector circuits equal to the number of control devices and each including a selector switch; mechanical actuating means operatively connected to said selector switches of said selector circuits for selectively closing one of said selector switches; a plurality of holding circuits respectively bridging said selector circuits; a plurality of control relays having their coils electrically connected respectively to said holding circuits and to said selector circuits bridged thereby, said control relays respectively including a plurality of first normally open switches respectively located in said lines leading to said control devices and a plurality of second normally open switches respectively located in said holding circuits; an additional electrically conductive line leading to said selector circuits for feeding current thereto; an additional relay having its coil connected in parallel with said holding circuits and having a normally closed switch located in said additional line; and a control switch electrically connected to said holding circuits and additional relay for directing current to said holding circuits and additional relay when said control switch is closed, whereby when said control switch is open said holding circuits are open and said normally closed switch of said additional relay is closed to feed current through that one of said selector circuits which includes said one selector switch to energize that one of said control relays which is connected to said one selector circuit and thereby close the pair of normally open switches of said one control relay and whereby when said control switch is closed current will flow through the holding circuit including one of the normally open switches of said one control relay to maintain the latter relay energized and to maintain the control device electrically connected to the other of the normally open switches of said one control relay energized.

2. Electrical control apparatus comprising, in combination, a plurality of electrical control devices adapted to be selectively energized; a plurality of electrically conductive lines respectively leading to said control devices for feeding current thereto; a plurality of selector circuits equal to the number of control devices and each including a selector switch; mechanical actuating means operatively connected to said selector switches of said selector circuits for selectively closing one of said selector switches; a plurality of holding circuits respectively bridging at least said selector switches of said selector circuits; a plurality of control relays having their coils electrically connected respectively to said holding circuits and to said selector circuits, said control relays respectively including a plurality of first normally open switches respectively located in said lines leading to said control devices and a plurality of second normally open switches respectively located in said holding circuits, and each of said control relays including a plurality of normally closed switches respectively located in all selector circuits except the selector circuit connected to said control relay so that when one of said control relays is energized it is impossible for any other control relay to be energized; and means for closing the holding circuit bridging said one selector switch to maintain the control device connected electrically to the selector circuit including said one selector switch energized after said latter switch is opened, and for maintaining said latter holding circuit closed until another of said selector switches is closed to energize another control device, so that the operation of the apparatus may be instantly changed over from one control device to another control device.

3. Electrical control apparatus comprising, in combination, a plurality of electrical control devices adapted to be selectively energized; a plurality of electrically conductive lines respectively leading to said control devices for feeding current thereto; a plurality of selector circuits equal to the number of control devices and each including a selector switch; mechanical actuating means operatively connected to said selector switches of said selector circuits for selectively closing one of said selector switches; a plurality of holding circuits respectively bridging said selector switches; a plurality of control relays having their coils electrically connected respectively to said holding circuits and to said selector switches bridged thereby, said control relays respectively including a plurality of first normally open switches respectively located in said lines leading to said control devices and a plurality of second normally open switches respectively located in said holding circuits; an additional electrically conductive line leading to said selector switches for feeding current thereto; an additional relay having its coil connected in parallel with said holding circuits and selector switches and having a normally closed switch located in said additional line; and a control switch connected in series with the coil of said additional relay for directing current to said holding circuits and selector switches when said control switch is open, whereby when said control switch is temporarily closed said normally closed switch of said additional relay is temporarily opened so that all of said selector circuits and holding circuits are open, and when then one of said selector switches is closed and subsequently said control switch is opened, said normally closed switch of said additional relay is closed to feed current through that one of said selector circuits which includes said one selector switch to energize that one of said control relays which is connected to said one selector circuit and thereby close the pair of normally open switches of said one control relay, so as to close the holding circuit of said one control relay and to energize the electrical control device associated with said one selector switch and to maintain said one control device electrically connected to the other of the normally open switches of said one control relay energized.

References Cited in the file of this patent

UNITED STATES PATENTS

| | | |
|---|---|---|
| 2,279,986 | Griswold | Apr. 14, 1942 |
| 2,359,064 | Van Hamersveld | Sept. 26, 1944 |
| 2,410,198 | Buckley | Oct. 29, 1946 |
| 2,437,893 | Ray | Mar. 16, 1948 |
| 2,572,541 | Thompson | Oct. 23, 1951 |
| 2,573,152 | Leifer | Oct. 30, 1951 |
| 2,602,150 | Hauck | July 1, 1952 |
| 2,716,206 | Salati | Aug. 23, 1955 |